(12) United States Patent
Ballantine et al.

(10) Patent No.: US 9,478,985 B2
(45) Date of Patent: Oct. 25, 2016

(54) INTEGRATED FUEL CELL SYSTEM WITH AUXILIARY POWER DELIVERY

(75) Inventors: Arne Watson Ballantine, Palo Alto, CA (US); Ramesh Srinivasan, Bangalore (IN); Stuart Aaron, Los Altos, CA (US); Peter Light, San Francisco, CA (US); Josh Richman, Mountain View, CA (US); Ranganathan Gurunathan, Bangalore (IN); Chad Pearson, Mountain View, CA (US)

(73) Assignee: BLOOM ENERGY CORPORATION, Sunnyvale, CA (US)

( * ) Notice: Subject to any disclaimer, the term of this patent is extended or adjusted under 35 U.S.C. 154(b) by 866 days.

(21) Appl. No.: 13/618,701

(22) Filed: Sep. 14, 2012

(65) Prior Publication Data

US 2013/0009481 A1 Jan. 10, 2013

Related U.S. Application Data

(60) Division of application No. 12/458,356, filed on Jul. 8, 2009, now Pat. No. 8,288,891, which is a continuation-in-part of application No. 12/149,488, filed on May 2, 2008, now Pat. No. 8,232,676.

(51) Int. Cl.
*H02J 9/00* (2006.01)
*H02J 1/10* (2006.01)
(Continued)

(52) U.S. Cl.
CPC ............... *H02J 1/102* (2013.01); *H02J 7/35* (2013.01); *H02J 2001/004* (2013.01); *Y02P 80/11* (2015.11); *Y10T 307/62* (2015.04); *Y10T 307/625* (2015.04); *Y10T 307/707* (2015.04)

(58) Field of Classification Search
USPC .......................................................... 307/65
See application file for complete search history.

(56) References Cited

U.S. PATENT DOCUMENTS

| 4,054,827 A | 10/1977 | Reimers | |
| 5,790,396 A * | 8/1998 | Miyazaki | ............. H02M 7/487 363/41 |

(Continued)

FOREIGN PATENT DOCUMENTS

CN 101156295 A 4/2008

OTHER PUBLICATIONS

Office Action received in connection with Taiwan Patent Application No. 099122589, issued Sep. 9, 2014 (with English translation).
(Continued)

*Primary Examiner* — Rexford Barnie
*Assistant Examiner* — Dru Parries
(74) *Attorney, Agent, or Firm* — The Marbury Law Group PLLC (57) ABSTRACT

A method of providing electrical power using a split bus configuration includes receiving a first direct current at a positive bus of a split bus, where the first direct current originates from a first fuel cell segment. A second direct current is received at a negative bus of the split bus, where the second direct current originates from a second fuel cell segment. A third direct current is also received at the split bus such that a combined direct current is formed including the first direct current, the second direct current, and the third direct current. The third direct current originates from an alternative direct current (DC) source. The combined direct current is provided to an inverter such that an alternating current is generated for a load.

20 Claims, 6 Drawing Sheets

(51) Int. Cl.
*H02J 7/35* (2006.01)
*H02J 1/00* (2006.01)

(56) References Cited

U.S. PATENT DOCUMENTS

| | | |
|---|---|---|
| 6,854,688 B2 | 2/2005 | McElroy et al. |
| 7,705,490 B2 | 4/2010 | Srinivasan et al. |
| 7,839,020 B2 | 11/2010 | Nakanishi |
| 2006/0238941 A1* | 10/2006 | Ingemi et al. ............... 361/92 |
| 2007/0196704 A1 | 8/2007 | Valensa et al. |
| 2008/0067869 A1 | 3/2008 | Evans |
| 2008/0224538 A1 | 9/2008 | Choi et al. |
| 2008/0280175 A1 | 11/2008 | Gurunathan |
| 2011/0278935 A1 | 11/2011 | Gurunathan |
| 2011/0281185 A1 | 11/2011 | Sridhar et al. |

OTHER PUBLICATIONS

International Search Report and Written Opinion of the International Searching Authority, in PCT Application PCT/US2010/041221, mailed Feb. 25, 2011.

Urciuoli, Damian, "Switching Stage Design and Implementation for an Efficient Three-Phase 5kW PWM DC-DC Converter," Thesis submitted to the Faculty of the Virginia Polytechnic Institute, Aug. 4, 2003, pp. i-79.

Dai, Min et al., "A Three-Phase Four-Wire Inverter Control Technique for a Single Distributed Generation Unit in Island Mode", IEEE Transactions on Power Electronics, vol. 23, No. 1, Jan. 4, 2008, pp. 322-331.

International Preliminary Report on Patentability issued in PCT Application PCT/US2010/041221, mailed on Jan. 19, 2012.

* cited by examiner

INTEGRATED FUEL CELL SYSTEM WITH AUXILIARY POWER DELIVERY

CROSS REFERENCE TO RELATED PATENT APPLICATIONS

The present application is a Continuation-In-Part of U.S. patent application Ser. No. 12/149,488, filed May 2, 2008, which is incorporated herein by reference in its entirety.

FIELD

The subject of the disclosure relates generally to an integrated fuel cell system which may be configured to provide auxiliary power to one or more auxiliary devices.

BACKGROUND

Electrical power systems can be used to provide electrical power to one more loads such as buildings, appliances, lights, tools, air conditioners, heating units, factory equipment and machinery, power storage units, computers, security systems, etc. The electricity used to power loads is often received from an electrical grid. However, the electricity for loads may also be provided through alternative power sources such as fuel cells, solar arrays, wind turbines, thermo-electric devices, batteries, etc. The alternative power sources can be used in conjunction with the electrical grid, and a plurality of alternative power sources may be combined in a single electrical power system. Alternative power sources are generally combined after conversion into an alternating current (AC). As a result, synchronization of alternative power sources is required.

In addition, many alternative power sources use machines such as pumps and blowers which run off of auxiliary power. Motors for these pumps and blowers are typically 3-phase AC motors which may require speed control. If the alternative power source generates a direct current (DC), the direct current undergoes several states of power conversion prior to delivery to the motor(s). Alternatively, the power to the motors for pumps, blowers, etc. may be provided using the electrical grid, an inverter, and a variable frequency drive. In such a configuration, two stages of power conversion of the inverter are incurred along with two additional stages of power conversion for driving components of the AC driven variable frequency drive. In general, each power conversion stage that is performed adds cost to the system, adds complexity to the system, and lowers the efficiency of the system.

SUMMARY

An exemplary method of providing electrical power using a split bus configuration is provided. The method includes receiving a first direct current at a positive bus of a split bus, where the first direct current originates from a first fuel cell segment. A second direct current is received at a negative bus of the split bus, where the second direct current originates from a second fuel cell segment. A third direct current is also received at the split bus such that a combined direct current is formed including the first direct current, the second direct current, and the third direct current. The third direct current originates from an alternative direct current (DC) source. The combined direct current is provided to an inverter such that an alternating current is generated for a load.

An exemplary system for providing electrical power using a split bus configuration is also provided. The system includes a first fuel cell segment, a second fuel cell segment, an alternative direct current source, and a split bus. The first fuel cell segment is configured to generate a first direct current for a positive bus of a split bus. The second fuel cell segment is configured to generate a second direct current for a negative bus of the split bus. The alternative direct current (DC) source is configured to generate a third direct current for the split bus. The split bus is configured to receive the first direct current, the second direct current, and the third direct current such that a combined direct current is formed. The split bus comprises the positive bus, the negative bus, and a neutral bus, and is configured to provide the combined direct current to an inverter for powering a load.

An exemplary split bus driver is also provided. The split bus driver includes an input, an inverter, and an output. The input is configured to receive a direct current from a split bus having a positive bus, a negative bus, and a neutral bus, where the direct current originates at least in part from a fuel cell segment. The inverter is configured to generate an alternating current based on the received direct current. The output is configured to provide the generated alternating current to an auxiliary device associated with the fuel cell segment.

Another exemplary method for providing electrical power to an auxiliary device is provided. The method includes receiving, at a driver, a direct current from a split bus having a positive bus, a negative bus, and a neutral bus, where the direct current originates at least in part from a fuel cell segment. An alternating current is generated based on the received direct current. The generated alternating current is provided to an auxiliary device associated with the fuel cell segment.

Another exemplary split bus driver is also provided. The split bus driver includes means for receiving a direct current from a split bus having a positive bus, a negative bus, and a neutral bus, wherein the direct current originates at least in part from a fuel cell segment. The split bus driver also includes means for generating an alternating current based on the received direct current. The split bus driver further includes means for providing the generated alternating current to an auxiliary device associated with the fuel cell segment.

Other features and advantages will become apparent to those skilled in the art upon review of the following drawings, the detailed description, and the appended claims.

BRIEF DESCRIPTION OF THE DRAWINGS

Exemplary embodiments will hereafter be described with reference to the accompanying drawings.

DETAILED DESCRIPTION

Thus, the inventors have perceived a need for an integrated power system which minimizes the number of power stages used to provide auxiliary power to auxiliary components such as pumps and blowers. Further, the inventors have perceived a need for an integrated power system in which a plurality of alternative power sources can be efficiently combined.

Figure 1:
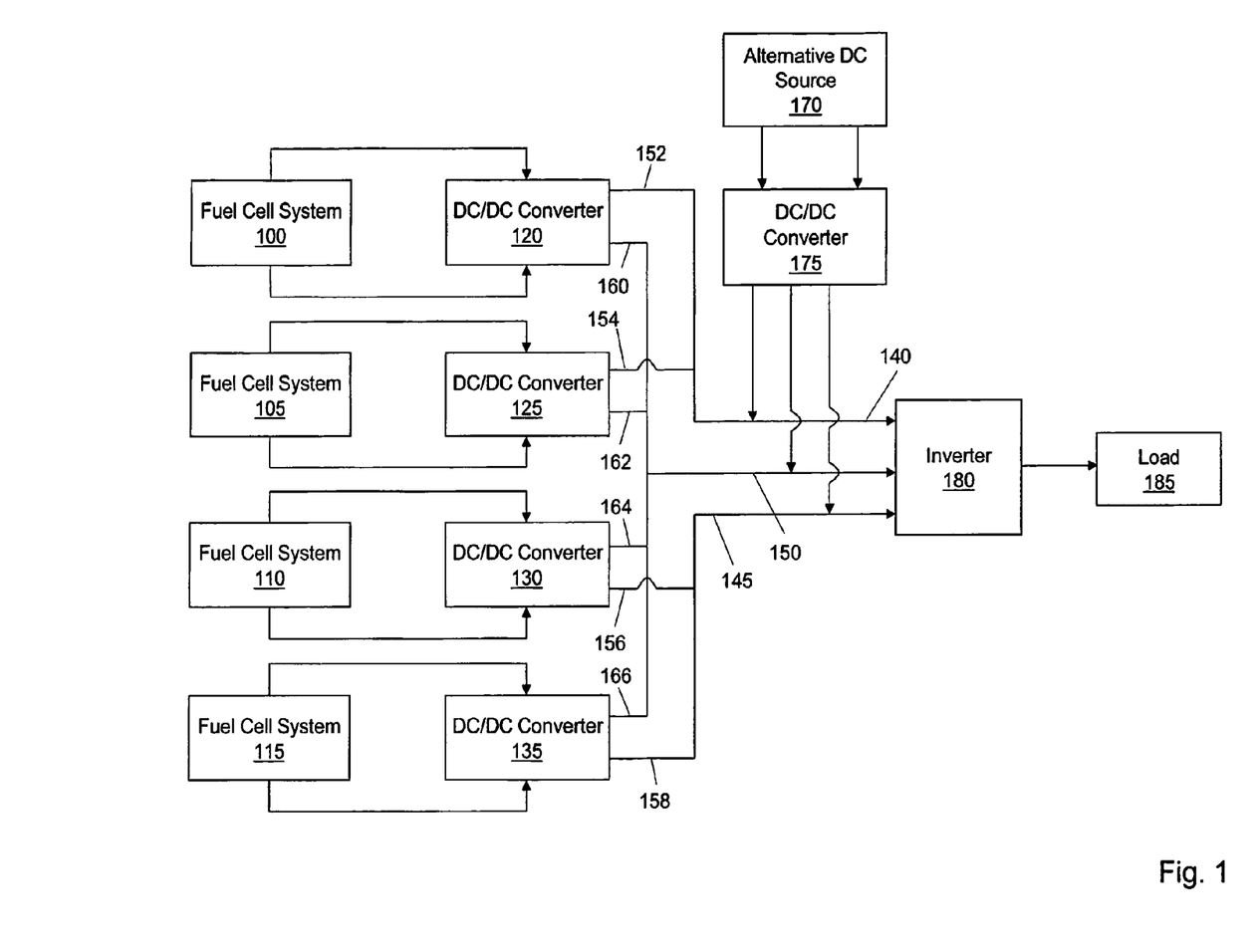
FIG. 1 is a block diagram illustrating an integrated power system with a split bus configuration in accordance with an exemplary embodiment.

FIG. 1 is a block diagram illustrating an integrated power system with a split bus configuration in accordance with an exemplary embodiment. The integrated power system (or system) includes a first fuel cell system 100, a second fuel cell system 105, a third fuel cell system 110, and a fourth fuel cell system 115. In alternative embodiments, fewer or additional fuel cell systems can be included in the system. In an exemplary embodiment, a fuel cell system can include one or more fuel cell segments, each of which may contain one or more fuel cell columns that are electrically connected to one another to provide a single positive output and a single negative output. Each fuel cell column can include one or more fuel cells stacks, such as solid oxide fuel cell stacks. A fuel cell stack can refer to a plurality of individual fuel cells which are electrically connected in series. Alternatively, a fuel cell system can refer to a single fuel cell column or to a single fuel cell stack. The number of individual fuel cells which make up a given fuel cell system can depend on the amount of electrical power which the given fuel cell system is intended to generate. In alternative embodiments, fuel cell system 100 can include any other configuration, arrangement, and/or number of individual fuel cells. An exemplary fuel system is described in U.S. patent application Ser. No. 11/797,707 (filed May 7, 2007 and entitled Ripple Cancellation), the disclosure of which is incorporated herein by reference in its entirety.

Each of the fuel cell systems 100, 105, 110, and 115 can produce a direct current (DC) as known to those of skill in the art. The amount of direct current produced by fuel cell system 100 may be controlled by a system monitor based on load demand and/or power available from a grid (not shown) in communication with the system. The system monitor can be a monitoring and/or control apparatus, such as a computer or other controller, which is configured to monitor and/or control the fuel cell systems 100, 105, 110, and 115. A DC/DC converter 120 is in electrical communication with fuel cell system 100 and can be used to increase (i.e., boost) the voltage of the DC signal produced by fuel cell system 100. Similarly, fuel cell system 105 is in electrical communication with a DC/DC converter 125, fuel cell system 110 is in electrical communication with a DC/DC converter 130, and fuel cell system 115 is in electrical communication with a DC/DC converter 135. In an alternative embodiment, DC/DC converters 120, 125, 130, and 135 may be used to decrease the voltage of the DC signals produced by fuel cell systems 100, 105, 110, and 115. In another alternative embodiment, DC/DC converters 120, 125, 130, and 135 may not be used. As used herein, electrical communication can refer to any direct or indirect electrical connection.

In one embodiment, the system monitor can be implemented as hardware, software, or any combination thereof. In an illustrative embodiment, the system monitor can include a processor and a tangible computer-readable medium such as a memory, magnetic storage device, optical disk, smart card, flash memory device, etc. The tangible computer-readable medium can be configured to store computer-executable instructions that, when executed, cause the system monitor to perform any of the fuel cell system operations described herein. The system monitor can also include a user input for receiving commands and/or programming instructions, and an output such as a display.

As illustrated in FIG. 1, positive and negative outputs of the DC/DC converters 120, 125, 130, and 135 are combined to form a spit bus. The split bus includes a positive bus 140, a negative bus 145, and a neutral bus 150. Positive bus 140 is formed with a positive output 152 from DC/DC converter 120 and a positive output 154 from DC/DC converter 125. Negative bus 145 is formed with a negative output 156 from DC/DC converter 130 and a negative output 158 from DC/DC converter 135. Neutral bus 150 is formed with a neutral output 160 from DC/DC converter 120, a neutral output 162 from DC/DC converter 125, a neutral output 164 from DC/DC converter 130, and a neutral output 166 from DC/DC converter 135. In alternative embodiments, the split bus may be formed by other combinations of the outputs of DC/DC converters 120, 125, 130, and 135. In one embodiment, the system may include additional fuel cell systems and/or DC/DC converters which provide DC signals to the split bus.

The integrated power system also includes an alternative DC power source 170. Alternative DC power source 170 can be a solar array, a wind turbine, a thermo-electric device, a battery, a fuel cell system, or any other DC source. In alternative embodiments, a plurality of alternative DC sources may be utilized in the system. Alternative DC power source 170 is in electrical communication with a DC/DC converter 175, and DC/DC converter 175 is in electrical communication with the split bus. As such, DC/DC converter 175 can provide a positive DC signal to positive bus 140, a negative DC signal to negative bus 145, and a neutral DC signal to neutral bus 150. In an alternative embodiment, DC/DC converter 175 may not be in electrical communication with neutral bus 150. As illustrated in FIG. 1, the split bus can be used to combine a DC signal from alternative DC source 170 with DC signals from fuel cell systems 100, 105, 110, and 115. The split bus configuration allows for the neutral signal to be derived downstream of alternative DC source 170 and fuel cell systems 100, 105, 110, and 115. In addition, the split bus configuration provides full galvanic isolation.

As illustrated in FIG. 1, the split bus serves as an input to an inverter 180. Inverter 180 can be any electrical device configured to receive a direct current and convert the received direct current into an alternating current. Inverter 180 is in electrical communication with a load 185 for providing an AC signal to load 185. In an exemplary embodiment, the AC signal from inverter 180 to load 185 can be a three-phase AC signal. Alternatively, any other AC signal may be used. Load 185 can be an external load such as a building, an appliance, an air conditioner, a heating unit, a computer, a security system, etc. Load 185 may also be an electrical grid to which electrical power is being provided by the integrated power system. Alternatively, load 185 may be an internal load such as an auxiliary device, a fuel cell startup load, a fuel cell machine load, etc. Because alternative DC source 170 is connected to the DC split bus before inverter 180, the DC signals from fuel cells 100, 105, 110, and 115 are integrated with the DC signal from alternative DC source 170 in a DC state, and there is no need to provide AC synchronization of the signals. Further, the integration of the signals allows a single inverter 180 to be used for providing power to load 185. In one embodiment, power for auxiliary devices and/or startup may drawn from the split bus before inverter 180. Such an embodiment is described with reference to FIGS. 3 and 4.

In an exemplary embodiment, alternative DC source 170 may be a solar cell array, and fuel cell systems 100, 105, 110, and 115 may be mounted in a cabinet. As known to those of skill in the art, sunlight, which is the catalyst for generating a DC signal using the solar array, can be deleterious to a fuel cell system. As such, the solar cell array may be mounted on a top and/or one or more sides of the cabinet housing fuel cell systems 100, 105, 110, and 115. As such, the solar cell array can absorb sunlight incident on the cabinet and reduce the amount of heat/sunlight that is transferred to the cabinet. The reduction of heat and sunlight on fuel cell systems 100, 105, 110, and 115 can result in improved efficiency and reduced wear and tear. In alternative embodiments, the solar cell array may be mounted independent of fuel cell systems 100, 105, 110, and 115.

Figure 2:
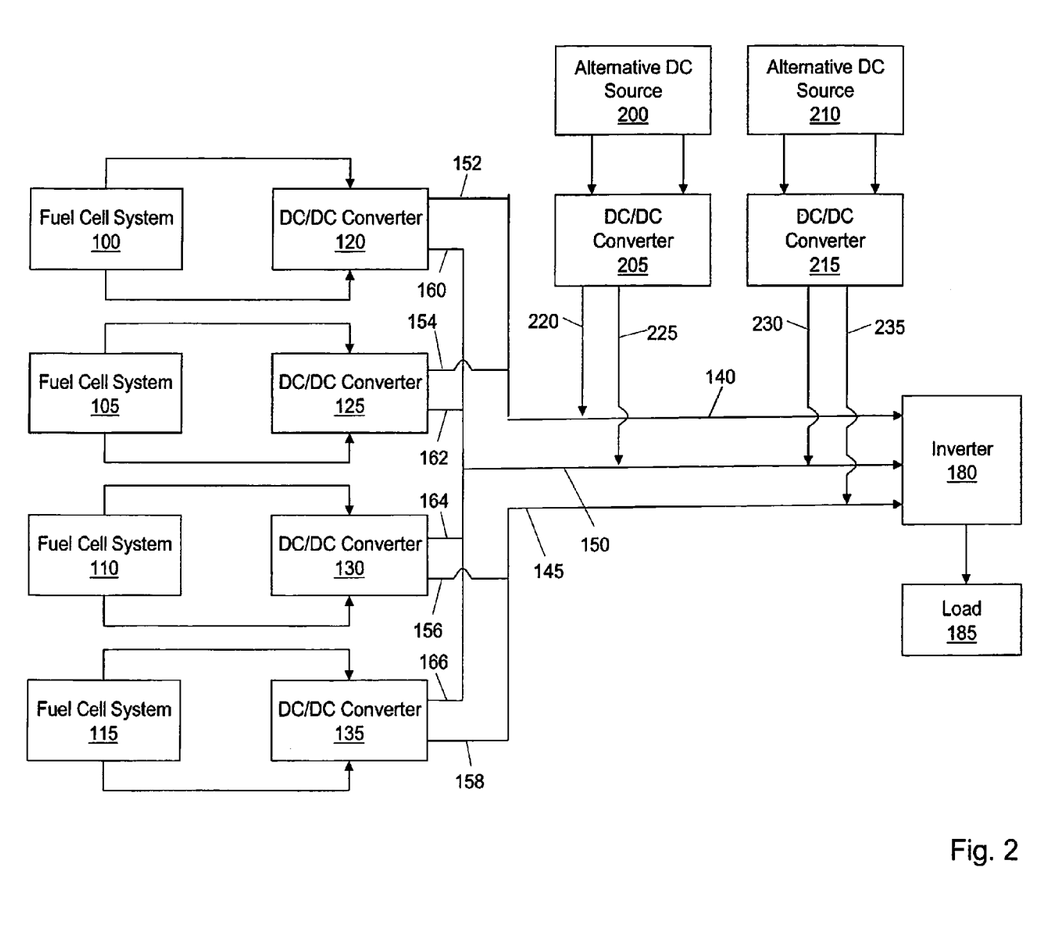
FIG. 2 is a block diagram illustrating the integrated power system of FIG. 1 with two alternative DC sources in accordance with an exemplary embodiment.

FIG. 2 is a block diagram illustrating the integrated power system of FIG. 1 with two alternative DC sources in accordance with an exemplary embodiment. As illustrated in FIG. 2, alternative DC source 170 of FIG. 1 has been replaced by alternative DC source 200 and alternative DC source 210. Fuel cell systems 100, 105, 110, and 115, inverter 180, and load 185 can operate as described above with reference to FIG. 1. First alternative DC source 200 provides a first DC signal to a DC/DC converter 205, and second alternative DC source 210 provides a second DC signal to a second DC/DC converter 215. DC/DC converter 205 and DC/DC converter 215 can boost the first DC signal and the second DC signal, respectively, as described above with reference to FIG. 1. A first output 220 of DC/DC converter 205 is in electrical communication with positive bus 140 of the split bus, and a second output 225 of DC/DC converter 205 is in electrical communication with neutral bus 150 of the split bus. A first output 230 of DC/DC converter 215 is in electrical communication with neutral bus 150 of the split bus, and a second output 235 of DC/DC converter 215 is in electrical communication with negative bus 145 of the split bus. As such, the first DC signal from alternative DC source 200 can be used to provide a positive voltage to the split bus, and the second DC signal from alternative DC source 210 can be used to provide a negative voltage to the split bus.

In an alternative embodiment, alternative DC source 200 and/or alternative DC source 210 may be in electrical communication with both positive bus 140 and negative bus 150. In another alternative embodiment, the integrated system may include additional alternative DC sources. In one embodiment, a single alternative DC source may be in electrical communication with two or more DC/DC converters. For example, the single alternative DC source may be in electrical communication with a first DC/DC converter that is in electrical communication with positive bus 140 and neutral bus 150. The single alternative DC source may also be in electrical communication with a second DC/DC converter that is in electrical communication with negative bus 145 and neutral bus 150.

Figure 3:
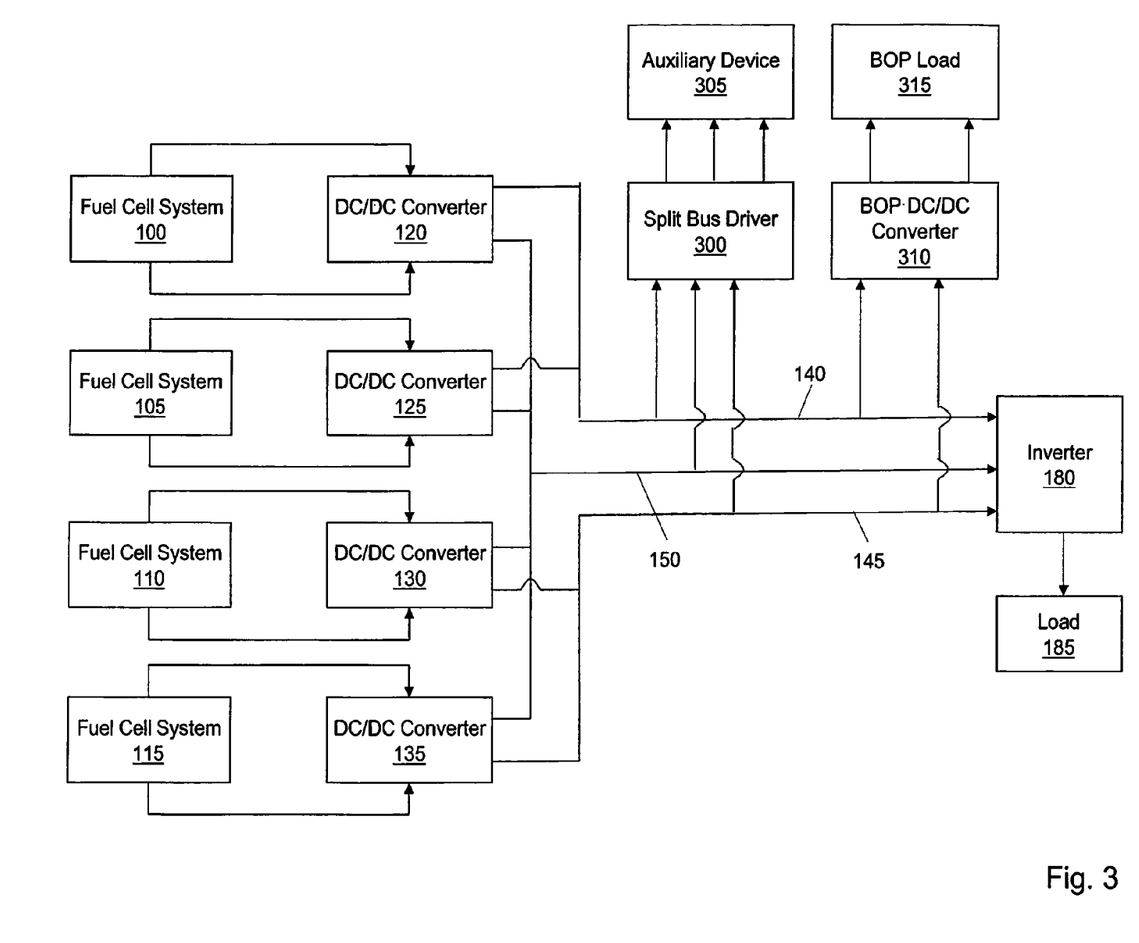
FIG. 3 is a block diagram illustrating an integrated power system with a split bus driver in accordance with an exemplary embodiment.

FIG. 3 is a block diagram illustrating an integrated power system with a split bus driver 300 in accordance with an exemplary embodiment. Fuel cells 100, 105, 110, and 115, DC/DC converters 120, 125, 130, and 135, inverter 180, and load 185 can operate as described above with reference to FIGS. 1 and 2. Split bus driver 300 can receive DC signals from positive bus 140, negative bus 145, and neutral bus 150. In an exemplary embodiment, split bus driver 300 can receive the DC signals from the split bus, generate an AC signal based on the received DC signals, and provide the generated AC signal to an auxiliary device 305. Auxiliary device 305 can be a motor, a pump, a fan, a blower, or any other auxiliary device. In one embodiment, auxiliary device 305 may be a three phase AC device which is used by one or more of fuel cell systems 100, 105, 110, and 115. For example, auxiliary device 305 may be a blower which is used to help regulate the temperature of fuel cell systems 100, 105, 110, and/or 115.

In an exemplary embodiment, split bus driver 300 can be a variable frequency driver device configured to provide electrical power to auxiliary device 305. As such, split bus driver 300 can be used to provide speed control to auxiliary device 305. The electrical power is received from the split bus and provided directly from split bus driver 300 to auxiliary device. As such, power can be delivered to auxiliary device 305 using two or fewer stages of power conversion. Such a minimized number of stages of power conversion results in increased efficiency, less space used, reduced heat generation, and a reduction in power electronics hardware. In one embodiment, split bus driver 300 and/or auxiliary device 305 can be controlled by a controller (not shown) in electrical communication with at least one of fuel cell systems 100, 105, 110, and 115.

Figure 4:
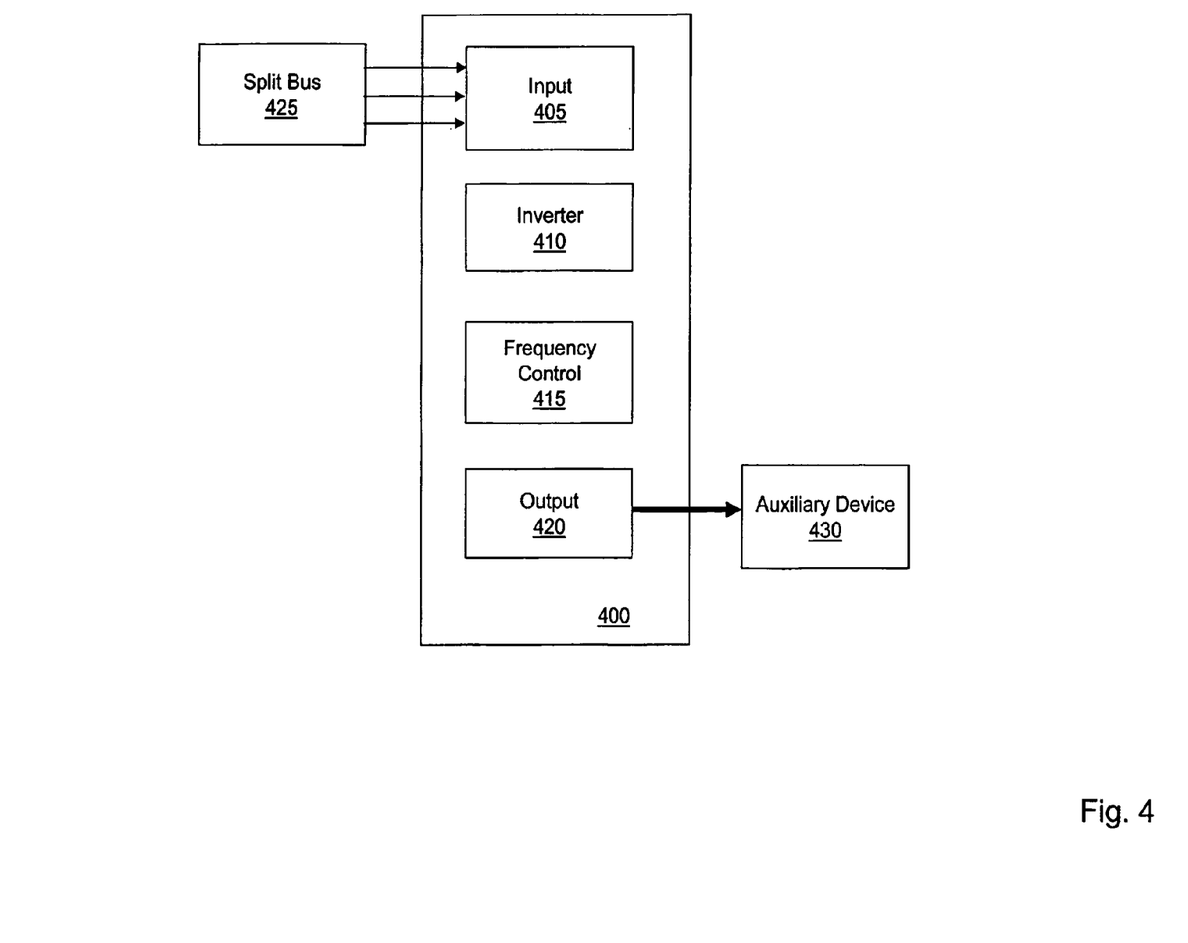
FIG. 4 is a block diagram illustrating components of a split bus driver in accordance with an exemplary embodiment.

FIG. 4 is a block diagram illustrating components of a split bus driver 400 in accordance with an exemplary embodiment. Split bus driver 400 has an input 405, an inverter 410, a frequency control 415, and an output 420, all of which may be in electrical communication with one another. In alternative embodiments, split bus driver 400 may have additional, fewer, or different components. Input 405 is in electrical communication with a split bus 425 having a positive bus, a negative bus, and a neutral bus. In an exemplary embodiment, split bus 425 can provide input 405 with a DC signal that originates from one or more fuel cell systems and/or one or more alternative DC sources. In another exemplary embodiment, prior to being received at input 405, the DC signal may go through zero power conversions (i.e., no DC/DC converters) or a single power conversion (i.e., a single DC/DC converter in electrical communication with a fuel cell system or an alternative DC source). Inverter 410 can be used to generate an alternating current (AC) signal based on the received DC signal. Alternatively, any other device(s) configured to convert a DC signal to an AC signal may be used in place of inverter 410. The AC signal can be a three-phase alternating current having a magnitude suitable for an auxiliary device 430. Frequency control 415 can be used to control the frequency of the AC signal based on the needs of auxiliary device 430 and/or the needs of a fuel cell system with which auxiliary device 430 is associated. Output 420, which is in electrical communication with auxiliary device 430, can be used to provide the AC signal to auxiliary device 430.

Referring back to FIG. 3, the integrated system also includes a balance of plant (BOP) DC/DC converter 310 and a BOP load 315. As such, a DC signal can be provided from the split bus to BOP load 315 prior to going through inverter 180. Balance of plant DC/DC converter 310, which is in electrical communication with positive bus 140 and negative bus 145 of the split bus, can increase or decrease the DC signal from the split bus to an appropriate level for BOP load 315. In an exemplary embodiment, BOP load 315 can be a startup load used by fuel cell systems 100, 105, 110, and 115 during an initial startup phase. Alternatively, BOP load 315 can be a startup load, a controller load, or any other type of balance of plant load.

In one embodiment, the integrated system of FIG. 3 may also include one or more alternative DC sources connected to the split bus such as those illustrated with reference to FIGS. 1 and 2. The integrated system may also include a plurality of split drivers configured to provide electrical power to a plurality of auxiliary devices. Alternatively, a single split bus driver may be configured to provide electrical power to a plurality of auxiliary devices.

Figure 5:
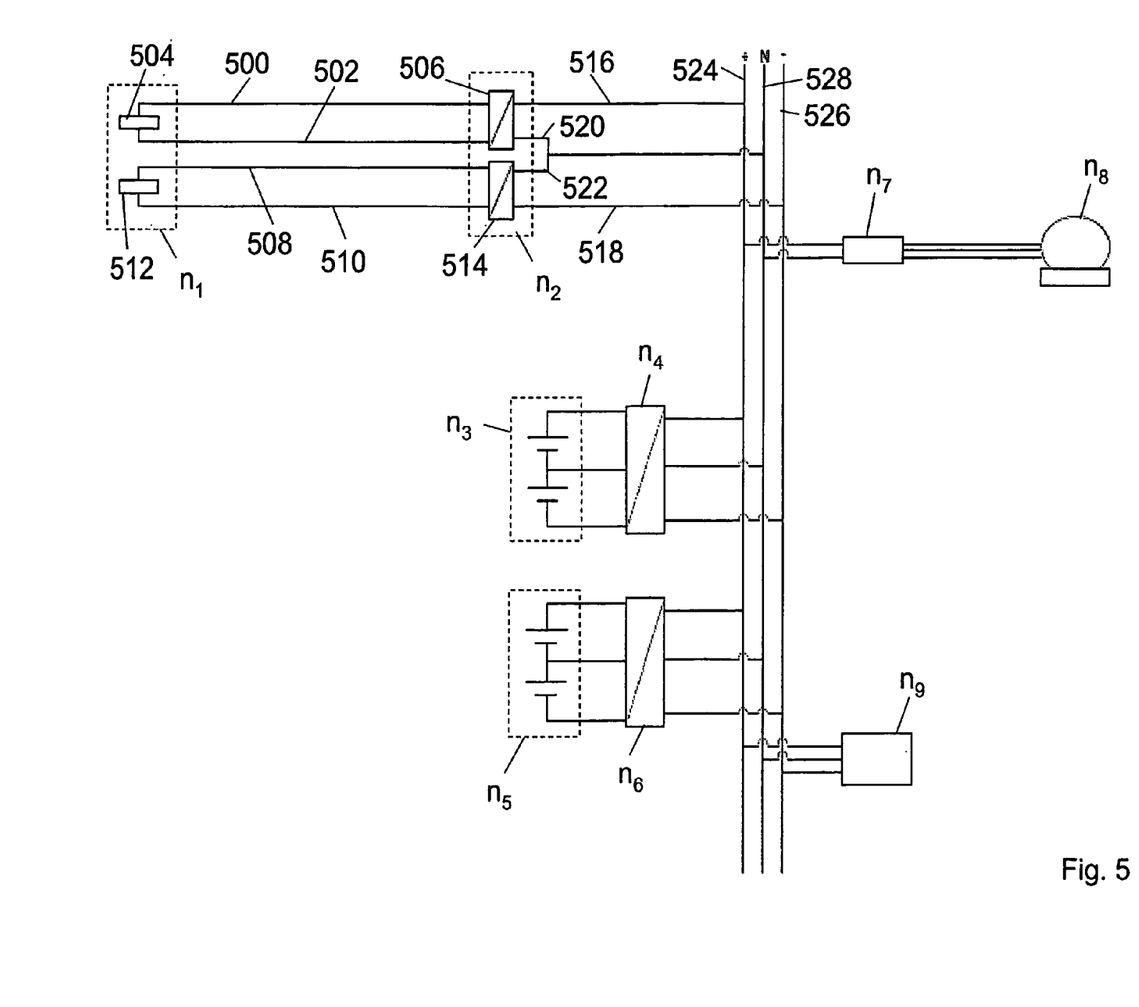
FIG. 5 is a block diagram illustrating an integrated power system with a first DC/DC converter configuration in accordance with an exemplary embodiment.

FIG. 5 is a block diagram illustrating an integrated power system with a first DC/DC converter configuration in accordance with an exemplary embodiment. The integrated power system includes $n_1$ fuel cell segments and $n_2$ DC/DC converters in electrical communication with the $n_1$ fuel cell segments. In one embodiment, the $n_1$ fuel cell segments can include 4 fuel cell segments, where each of the 4 fuel cell segments includes 2 fuel cell columns. Alternatively, the $n_1$ fuel cell segments can include any other number and/or configuration of fuel cell columns. In one embodiment, the $n_2$ DC/DC converters can include 4 DC/DC converters corresponding to the 4 fuel cell segments. Alternatively, the $n_2$ DC/DC converters can include any other number of DC/DC converters.

A positive output 500 and a negative output 502 of a first fuel cell segment 504 of the $n_1$ fuel cell segments are provided to a first DC/DC converter 506 of the $n_2$ DC/DC converters. Also, a positive output 508 and a negative output 510 of a second fuel cell segment 512 of the $n_1$ fuel cell segments are provided to a second DC/DC converter 514 of the $n_2$ DC/DC converters. As such, each of the $n_1$ fuel cell segments is associated with one of the $n_2$ DC/DC converters. A positive output 516 from first DC/DC converter 506 is provided to a positive bus 524 of a split bus. A negative output 518 from second DC/DC converter 514 is provided to a negative bus 526 of the split bus. A negative output 520 from first DC/DC converter 506 is combined with a positive output 522 from second DC/DC converter 514 and the combined signal is provided to a neutral bus 528 of the split bus. As such, each of the $n_2$ DC/DC converters is in electrical communication with positive bus 524 and neutral bus 528 or with negative bus 526 and neutral bus 528.

The integrated power system also includes $n_3$ batteries configured to provide electrical power to $n_4$ DC/DC converters. In an illustrative embodiment, $n_3$ and $n_4$ can be any values. The $n_4$ DC/DC converters are in electrical communication with positive bus 524, negative bus 526, and neutral bus 528 of the split bus. In one embodiment, the $n_4$ DC/DC converters can be bi-directional DC/DC converters such that the $n_3$ batteries can be charged via the split bus. The integrated power system also includes $n_5$ solar arrays configured to provide electrical power to $n_6$ DC/DC converters. In an illustrative embodiment, $n_5$ and $n_6$ can be any values. The $n_6$ DC/DC converters are in electrical communication with positive bus 524, negative bus 526, and neutral bus 528 of the split bus for providing electrical power thereto. In one embodiment, the $n_5$ solar arrays may be mounted to a roof or other area of a structure that contains the $n_1$ fuel cell segments of the integrated power system. In an alternative embodiment, the $n_5$ solar arrays may be any other type of alternative power sources such as wind turbines, thermoelectric devices, hydroelectric devices, etc.

The integrated power system of FIG. 5 also includes $n_7$ variable frequency drives configured to provide electrical power from the split bus to $n_8$ motors. The $n_7$ variable frequency drives, which may include inverters, can be used to control a frequency of an alternating current signal provided to the $n_8$ motors. Alternatively, separate inverters (not shown) may be used. The integrated power system may also include one or more additional DC/DC converters (not shown) configured to provide electrical power from the split bus to the $n_7$ variable frequency drives (or inverters associated with the $n_7$ variable frequency drives) and to a 24 volt converter for small balance of plant devices. In one embodiment, the one or more additional DC/DC converters can be 300 volt DC/DC converters. Alternatively, any other voltage may be used.

In one embodiment, $n_7$ can be 4 and $n_8$ can be 5. In such an embodiment, 3 variable frequency drives can be in electrical communication with 3 blower motors and 1 variable frequency drive can be in electrical communication with 2 fan motors. Alternatively, $n_7$ and $n_8$ can be any other values and/or any other ratio of variable frequency drives to motors may be used. In another alternative embodiment, the motors can be associated with any other peripheral devices, balance of plant devices, etc. of the integrated power system. The integrated power system further includes $n_9$ inverters in electrical communication with the split bus, where $n_9$ can be any value. The $n_9$ inverters can be configured to convert a DC signal from the split bus to an AC signal for provision to an external load (not shown) such as an electrical grid, etc.

Figure 6:
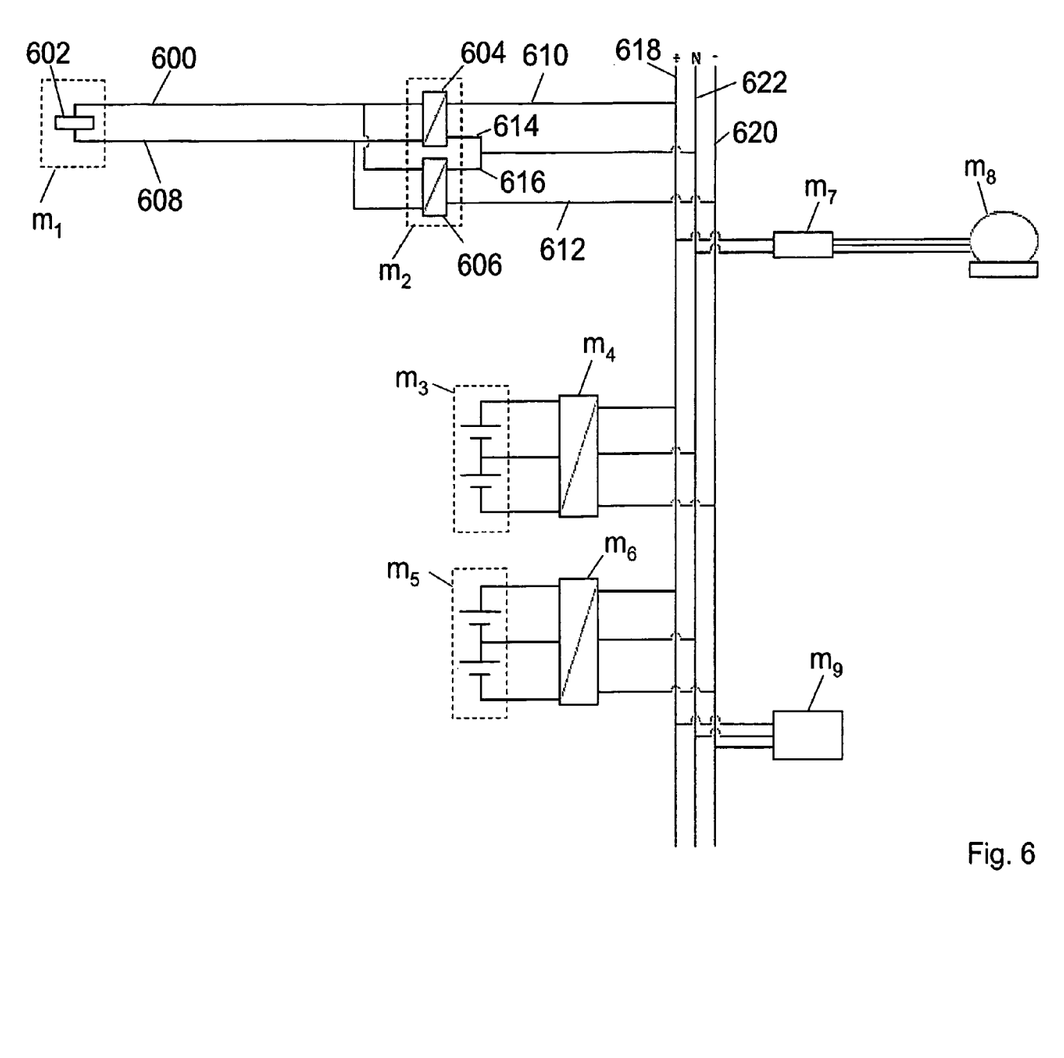
FIG. 6 is a block diagram illustrating an integrated power system with a second DC/DC converter configuration in accordance with an exemplary embodiment.

FIG. 6 is a block diagram illustrating an integrated power system with a second DC/DC converter configuration in accordance with an exemplary embodiment. The integrated power system can include one or more fuel cell segments which form one or more power modules, and one or more input/output modules. In one embodiment, the integrated system can include 6 power modules and 1 input/output module. Alternatively, the system may include 5 power modules and 1 input/output module, 7 power modules and 1 input/output module, or any other number of power modules and input/output modules.

The integrated power system includes $m_1$ fuel cell segments and $m_2$ DC/DC converters in electrical communication with the $m_1$ fuel cell segments. In one embodiment, the $m_1$ fuel cell segments can include 4 fuel cell segments which form a power module of the integrated power system, where each of the 4 fuel cell segments includes 2 fuel cell columns. Alternatively, the $m_1$ fuel cell segments can include any other number and/or configuration of fuel cell columns. In one embodiment, the $m_2$ DC/DC converters can include 8 DC/DC converters per power module of the integrated power system. Alternatively, the $m_2$ DC/DC converters can include any other number of DC/DC converters.

A positive output 600 of a fuel cell segment 602 of the $m_1$ fuel cell segments is provided to a first DC/DC converter 604 and to a second DC/DC converter 606 of the $m_2$ DC/DC converters. A negative output 608 of fuel cell segment 602 is also provided to both first DC/DC converter 604 and second DC/DC converter 606. As such, each of the $m_1$ fuel cell segments is associated with two of the $m_2$ DC/DC converters. A positive output 610 from first DC/DC converter 604 is provided to a positive bus 618 of a split bus. A negative output 612 from second DC/DC converter 606 is provided to a negative bus 620 of the split bus. A negative output 614 from first DC/DC converter 604 is combined with a positive output 616 from second DC/DC converter 606 and the combined signal is provided to a neutral bus 622 of the split bus. As such, each of the $m_2$ DC/DC converters is in electrical communication with positive bus 618 and neutral bus 622 or with negative bus 620 and neutral bus 622.

The integrated power system also includes $m_3$ batteries configured to provide electrical power to $m_4$ DC/DC converters. In an illustrative embodiment, $m_3$ can be 2 and m4 can be 1 per power module of the integrated power system.

Alternatively, any other values may be used. The $m_4$ DC/DC converters are in electrical communication with positive bus 618, negative bus 620, and neutral bus 622 of the split bus. In one embodiment, the $m_4$ DC/DC converters can be bi-directional DC/DC converters such that the $m_3$ batteries can be charged via the split bus.

The integrated power system also includes $m_5$ solar arrays configured to provide electrical power to $m_6$ DC/DC converters. In an illustrative embodiment, $m_5$ and $m_6$ can be any values. The $m_6$ DC/DC converters are in electrical communication with positive bus 618, negative bus 620, and neutral bus 622 of the split bus for providing electrical power thereto. In one embodiment, the $m_5$ solar arrays may be mounted to a roof or other area of a structure that contains the $m_1$ fuel cell segments of the integrated power system. In an alternative embodiment, the $m_5$ solar arrays may be any other type of alternative power sources such as wind turbines, thermo-electric devices, hydroelectric devices, etc.

The integrated power system of FIG. 6 also includes $m_7$ variable frequency drives configured to provide electrical power from the split bus to $m_8$ motors. The $m_7$ variable frequency drives, which may include inverters, can be used to control a frequency of an alternating current signal provided to the $m_8$ motors. Alternatively, separate inverters (not shown) may be used. In one embodiment, $m_7$ may be 2 and $m_8$ may be 2 per power module of the integrated power system. In such an embodiment, the 2 motors can be blower motors, each having a dedicated variable frequency drive. Alternatively, any other values and/or ratio of variable frequency drives to motors may be used. In another alternative embodiment, the motors can be associated with any other peripheral devices, balance of plant devices, etc. of the integrated power system.

The integrated power system further includes $m_9$ inverters in electrical communication with the split bus. The $m_9$ inverters can be configured to convert a DC signal from the split bus to an AC signal for provision to an external load (not shown) such as an electrical grid, etc. The $m_9$ inverters can also be used in conjunction with one or more input/output modules of the integrated power system. In one embodiment, $m_9$ can be 10 inverters per input/output module. Alternatively, any other value may be used. Each power module of the integrated power system may also include a 24 volt DC/DC converter for providing power from the split bus to small devices. Each input/output module of the integrated power system may also include 2 24 volt DC/DC converters for providing power from the split bus to small devices. Alternatively, any other number of DC/DC converters for small devices may be used.

One or more block/flow diagrams have been used to describe exemplary embodiments. The use of block/flow diagrams is not meant to be limiting with respect to the order of operations performed. The foregoing description of exemplary embodiments has been presented for purposes of illustration and of description. It is not intended to be exhaustive or limiting with respect to the precise form disclosed, and modifications and variations are possible in light of the above teachings or may be acquired from practice of the disclosed embodiments. It is intended that the scope of the invention be defined by the claims appended hereto and their equivalents.

What is claimed is:

1. An electrical circuit comprising:
  a split bus having a positive bus, a negative bus, and a neutral bus, wherein the split bus is configured to convey a direct current, the positive bus is configured to convey a positive portion of the direct current from a first plurality of direct current sources, and the negative bus is configured to convey a negative portion of the direct current from a second plurality of direct current sources, and the direct current originating at least in part from a fuel cell segment;
  a split bus driver electrically connected to the split bus, wherein the split bus driver comprises:
    an input configured to receive the direct current from the split bus;
    a first inverter configured to generate a first alternating current based on the received direct current;
    an output configured to provide the generated first alternating current to an auxiliary device associated with the fuel cell segment; and
  a second inverter electrically connected to the split bus, wherein the second inverter is configured to generate a second alternating current based on the direct current and provide the second alternating current to a load.

2. The electrical circuit of claim 1, wherein the direct current undergoes zero power conversions or a single power conversion prior to being received at the input.

3. The electrical circuit of claim 2, wherein the single power conversion comprises a boost performed by a direct current/direct current (DC/DC) converter in electrical communication with the fuel cell segment.

4. The electrical circuit of claim 1, wherein the split bus driver further comprising a frequency control configured to control a frequency of the alternating current provided to the auxiliary device.

5. The electrical circuit of claim 1, wherein the direct current further originates from an alternative direct current (DC) source in electrical communication with the split bus.

6. A method for providing electrical power to an auxiliary device, the method comprising:
  receiving, at a driver, a direct current from a split bus having a positive bus, a negative bus, and a neutral bus, by receiving a positive portion of the direct current from a first plurality of direct current sources via the positive bus and a negative portion of the direct current from a second plurality of direct current sources via the negative bus, and wherein the direct current originates at least in part from a fuel cell segment;
  generating, by a first inverter, a first alternating current based on the received direct current;
  providing the generated first alternating current to an auxiliary device associated with the fuel cell segment;
  receiving, at a second inverter, the direct current from the split bus;
  generating, by the second inverter, a second alternating current based on the direct current; and
  providing the second alternating current to a load.

7. The method of claim 6, wherein the auxiliary device comprises a blower, a pump, or a motor.

8. The method of claim 6, wherein the generated first alternating current comprises a variable frequency alternating current.

9. A method for providing electrical power, comprising:
  providing a first direct current from an alternative DC power source to a split bus having a positive bus, a negative bus, and a neutral bus;
  receiving, at a driver, the first direct current from the split bus;
  generating a first alternating current based on the received first direct current;
  providing the generated first alternating current to an auxiliary device which regulates a temperature of a component of a fuel cell system;

providing a second direct current to the split bus from at least one fuel cell segment after the step providing the first direct current;

receiving, at an inverter, the second direct current from the split bus by receiving a positive portion of the direct current from a first plurality of direct current sources via the positive bus and a negative portion of the direct current from a second plurality of direct current sources via the negative bus;

generating a second alternating current based on the received second direct current; and providing the generated second alternating current to a load after the step of providing the second direct current.

10. The method of claim 9, wherein the device comprises the auxiliary device which regulates a temperature of the component of the fuel cell system after receiving power from the split bus.

11. The method of claim 10, wherein the auxiliary device is a blower.

12. The method of claim 9, further comprising providing power from the split bus to a balance of plant (BOP) load of the fuel cell system.

13. The method of claim 12, wherein the BOP load comprises a startup BOP load which receives power from the split bus in a startup mode of the fuel cell system.

14. The method of claim 12, the BOP load comprises the controller BOP load.

15. The method of claim 9, wherein the alternative DC power source is selected from a group consisting of a solar array, a wind turbine, a thermo-electric device, a hydroelectric device and a battery.

16. The method of claim 15, wherein the alternative DC power source is the battery.

17. The method of claim 15, wherein the alternative DC power source is the solar array.

18. The method of claim 15, wherein the alternative DC power source is the battery and the solar array.

19. The method of claim 9, further comprising:

receiving, at the driver, the second direct current from the split bus;

generating a third alternating current based on the received second direct current; and providing the generated third alternating current to the auxiliary device.

20. The method of claim 19, wherein the generated first alternating current comprises a variable frequency alternating current.

* * * * *